(12) United States Patent
Thuman et al.

(10) Patent No.: US 11,953,299 B2
(45) Date of Patent: Apr. 9, 2024

(54) WARHEAD AND METHOD OF PRODUCING SAME

(71) Applicant: BAE SYSTEMS BOFORS AB, Karlskoga (SE)

(72) Inventors: Christer Thuman, Karlskoga (SE); Björn Johansson, Karlskoga (SE); Hamzah Hamdan, Karlskoga (SE)

(73) Assignee: BAE SYSTEMS BOFORS AB, Karlskoga (SE)

( * ) Notice: Subject to any disclaimer, the term of this patent is extended or adjusted under 35 U.S.C. 154(b) by 252 days.

(21) Appl. No.: 17/436,634

(22) PCT Filed: Mar. 9, 2020

(86) PCT No.: PCT/SE2020/050256
§ 371 (c)(1),
(2) Date: Sep. 6, 2021

(87) PCT Pub. No.: WO2020/190192
PCT Pub. Date: Sep. 24, 2020

(65) Prior Publication Data
US 2022/0155046 A1    May 19, 2022

(30) Foreign Application Priority Data
Mar. 19, 2019    (SE) .................................... 1900053-8

(51) Int. Cl.
*F42B 12/24* (2006.01)
*B33Y 10/00* (2015.01)
*B33Y 80/00* (2015.01)

(52) U.S. Cl.
CPC .............. *F42B 12/24* (2013.01); *B33Y 10/00* (2014.12); *B33Y 80/00* (2014.12)

(58) Field of Classification Search
CPC .......... F42B 12/24; F42B 12/26; F42B 12/28; F42B 12/32; F42B 33/00; B33Y 10/00; B33Y 50/00; B33Y 80/00
(Continued)

(56) References Cited

U.S. PATENT DOCUMENTS

| 3,799,054 A | 3/1974 | Larocca |
| 4,982,668 A | 1/1991 | Bender et al. |

(Continued)

FOREIGN PATENT DOCUMENTS

| DE | 2536308 A | * 2/1977 | .............. F42B 12/32 |
| DE | 2536308 A1 | 2/1977 | |

(Continued)

OTHER PUBLICATIONS

International Search Report (dated May 8, 2020) for corresponding International App. PCT/SE2020/050256.

(Continued)

*Primary Examiner* — Bret Hayes
(74) *Attorney, Agent, or Firm* — WRB-IP PLLC

(57) ABSTRACT

A procedure for producing a warhead with controlled fragmentation includes manufacturing an inner shell and filling it with an explosive substance. The procedure further includes providing a net around the outer surface of the inner shell as well as depositing a material on and around the net. A warhead is produced by the procedure and includes an inner shell. A material applied to the warhead comprises weak points for guided fragmentation of the deposited material upon detonation of the warhead.

8 Claims, 8 Drawing Sheets

(58) Field of Classification Search
USPC ........................................ 102/506; 86/51, 53
See application file for complete search history.

(56) References Cited

U.S. PATENT DOCUMENTS

| | | | |
|---|---|---|---|
| 4,986,188 A | 1/1991 | Denis et al. | |
| 9,897,425 B1 * | 2/2018 | Hooke | ................... F42B 12/22 |
| 11,041,704 B1 * | 6/2021 | Ellis | ........................... B22F 7/08 |
| 2002/0014177 A1 | 2/2002 | Renaud-Bezot et al. | |
| 2016/0178336 A1 * | 6/2016 | Jennett | ................... F42B 12/22 |
| | | | 102/506 |
| 2017/0167833 A1 | 6/2017 | Jennett et al. | |
| 2021/0041215 A1 * | 2/2021 | Rastegar | ................. F42B 12/24 |

FOREIGN PATENT DOCUMENTS

| | | | | |
|---|---|---|---|---|
| DE | 2923877 A1 | 12/1980 | | |
| DE | 102007001998 A1 | 7/2008 | | |
| FR | 2978238 A1 | 1/2013 | | |
| FR | 2993355 A1 * | 1/2014 | ........... F42B 12/207 | |
| JP | 2011075251 A | 4/2011 | | |
| SE | 455924 B | 8/1988 | | |
| WO | 2017103741 A1 | 6/2017 | | |
| WO | 2017168146 A1 | 10/2017 | | |

OTHER PUBLICATIONS

European Search Report (dated Nov. 7, 2022) for corresponding European App. 20773310.6.
Japanese Official Action (dated Aug. 8, 2023) for corresponding Japanese App. 2021-552196.

* cited by examiner

WARHEAD AND METHOD OF PRODUCING SAME

BACKGROUND AND SUMMARY

The present invention concerns a procedure for producing a warhead with controlled fragmentation, whereby the procedure comprises the step that an inner shell is manufactured and filled with an explosive substance.

The invention also concerns a warhead produced by the procedure and comprising an inner shell.

Provision of preformed projectiles in warheads has been known for a long time. The effect is that with detonation the effectiveness as regards hard and soft targets varies depending on the spread upon detonation of projectiles with a preset size and mass. It is also possible to affect the direction in which the preformed projectiles will be spread.

Another way known to a person skilled in the art to produce projectiles with a predetermined size and mass is to effect controlled fragmentation of the warhead. In essence this means that weaknesses are provided in the warhead, for example by milling tracks in its material, so that at detonation the warhead divides according to these weaknesses rather than randomly.

It is also possible to combine the provision of preformed projectiles with controlled fragmentation in one and the same warhead.

A rubber fixture is often used during part of the manufacturing process to position preformed projectiles. Manufacture of the rubber fixture is in itself quite expensive and labor intensive. In a corresponding way, it is often difficult and work-intensive to produce guided fragmentation by milling tracks in the material of the warhead.

It is desirable to produce a simpler, faster, and more cost-effective method to manufacture a warhead with preformed projectiles and controlled fragmentation.

According to an aspect of the invention a procedure includes the following steps: a net is provided around the outer surface of the inner shell and a material is deposited on and around the net.

According to another aspect of the invention, a warhead includes a material deposited on the warhead comprising weak spots for guided fragmentation of the deposited material upon detonation of the warhead.

Further advantages are achieved if the invention also is given one or more of the characteristics in the dependent patent claims.

BRIEF DESCRIPTION OF THE DRAWINGS

The invention will now be described with reference to the attached drawings. These show.

DETAILED DESCRIPTION

Figure 1:
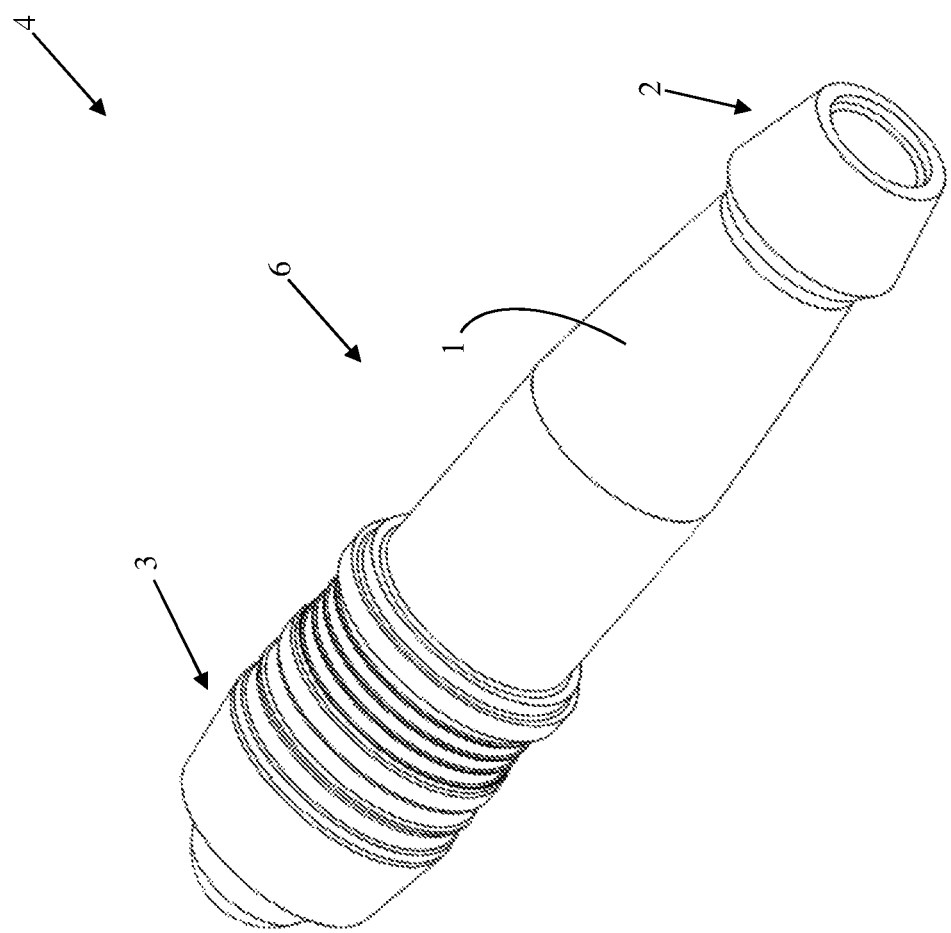
FIG. 1 a perspective view of the inner shell of a warhead according to the invention.

FIG. 1 shows an inner shell of a warhead according to the invention; The inner shell 1 is hollow in order to enable provision of an explosive substance there. The inner shell 1 is also designed for receiving a nose part and a rear part at its front 2 respectively rear 3 end. The nose part and rear part can be given a number of embodiments depending on the desired characteristics of the warhead, but since they do not have to do with the present invention, they are not shown on the drawing figures. Part 6 in the middle is somewhat recessed in the embodiment shown, i.e. it has a somewhat smaller radius than the front 2 and rear 3 ends.

The inner shell 1 is preferably manufactured of some material judged by experts to be suitable for the purpose, most often a metallic material. A number of examples of materials are already known in the area. The present invention does not comprise manufacturing the material itself or the manufacturing method for inner shell 1. The invention functions independently of the choice of material and the manufacturing method of the inner shell.

Figure 2:
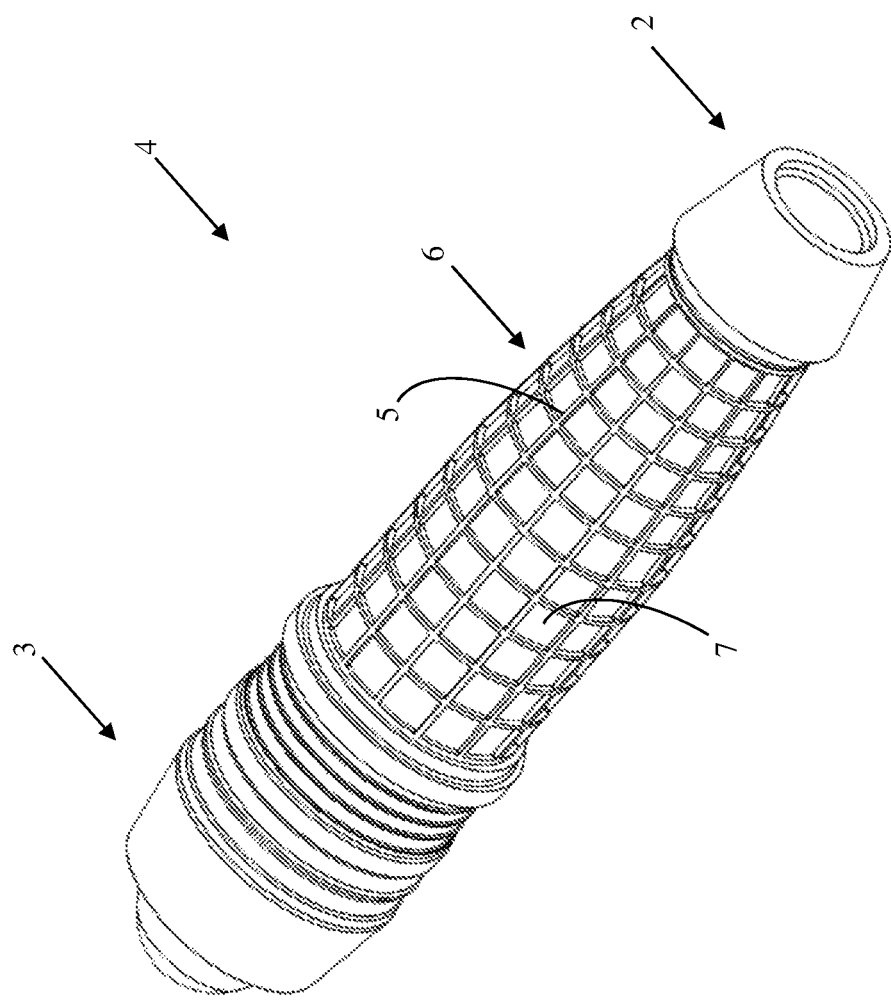
FIG. 2 a perspective view of the inner shell according to FIG. 1, provided with a surrounding net.

A step in manufacturing a warhead 4 according to the invention is shown in FIG. 2; A net 5 is provided around inner shell 1, preferably so that it encloses inner shell 1 in the circumferential direction. Net 5 extends along part of the inner shell 1 in the axial direction, but in the preferred embodiment the front end 2 and the back end 3 are left free for attachment to the nose resp. back parts. In the preferred embodiment net 5 is thus provided around recessed part 6.

In the embodiment shown, net 5 has square meshes 7, the size and form of which vary somewhat in the axial direction of the warhead in order to attach to the form of inner shell 1 with a radius that varies somewhat in the axial direction. The form of mesh 7 is variable within wide limits as is its size.

The manufactured material of net 5 is in many cases a metal that is selected so that it has characteristics that function together with a material applied to net 5. it will be described in further detail below. Some typical characteristics to consider with the choice of the material in net 5 are its melting point, its friability after heat treatment, and its ability to form alloys with other materials, especially material added later.

In certain embodiments net 5 has a retentive function for preformed projectiles provided inside the net. The size and form of the projectiles are variable. Some examples will be described below. Net 5 is designed so that it functions for intended retention of the projectiles, whereby the form and size of mesh 7 stops the projectiles from passing through them.

Figure 3:
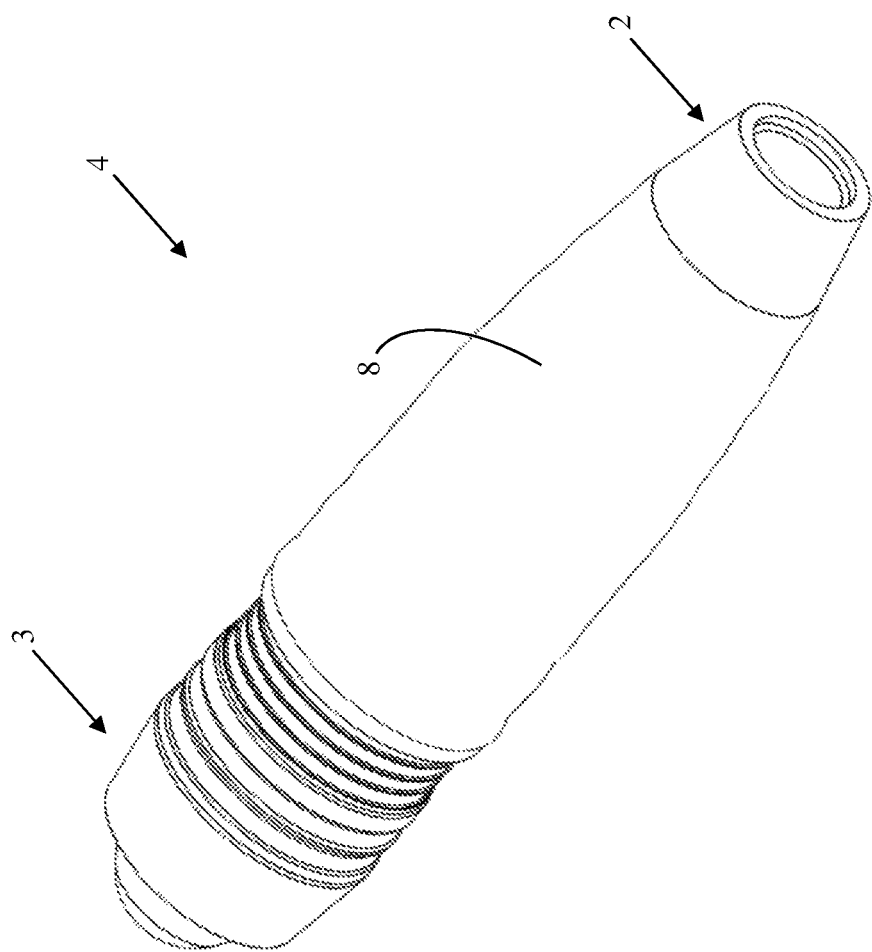
FIG. 3 a perspective view of a warhead with an outer layer of a deposited material.

FIG. 3 shows warhead 4 after a further manufacturing step. Laid-on material 8 has been applied on top of net 5 shown in FIG. 2. The method of application varies, but a preferred embodiment is some form of additive manufacturing method. The material is applicable in powder form or in the form of threads and is melted in connection with the application so that it is immediately fixed at the intended place on warhead 4.

The choice between powder and thread in additive manufacture depends on, among other things, the geometric dimensions and the adhesiveness that is required of the finished product. Powder is often preferred with tight manufacturing tolerances, i.e. when the material that is added must reach spaces with small dimensions. Material in thread form is, however, generally more cost effective and is often viewed to be adequate for the relevant dimensions and requirements for strength. Material in thread form also has the manufacturing advantage that the amount of material which is unintentionally emitted to the environment is minimal, i.e. in principle, the process does not raise dust at all.

The high temperatures necessary for smelting the applied material 8 also means that the material in the underlying net 5 is affected. With a suitable choice of material, both of the material in net 5 as in the applied material 8, the material in net 5 melts, becomes brittle, or forms an alloy with the added material 8. An alternative is that net 5 and the added material 8 do not affect each other's physical properties more than that the layer of added material 8 becomes thinner on top of the material added to net 5. In all of these cases, the added material and the temperature when adding the material are chosen so that the result is that the added material 8 and the net 5 form a unit together that includes weak spots where net 5 was originally placed.

The weak spots in the unit that is formed by the added material 8 and the net 5 will function to control fragmentation at the detonation of warhead 4. The part of the added material 8 which is arrayed in the mesh 7 of net 5 will thus form projectiles. This aspect of the preferred embodiment will be considered in the choice of added material 8 so that the projectiles formed have a suitable mass, and in the choice of the size and form of the mesh, so that the projectiles formed have a suitable size and form.

Some examples of material that can be chosen for the added material are aluminum, steel of various qualities, including stainless steel, and titanium, etc.

Figure 4:
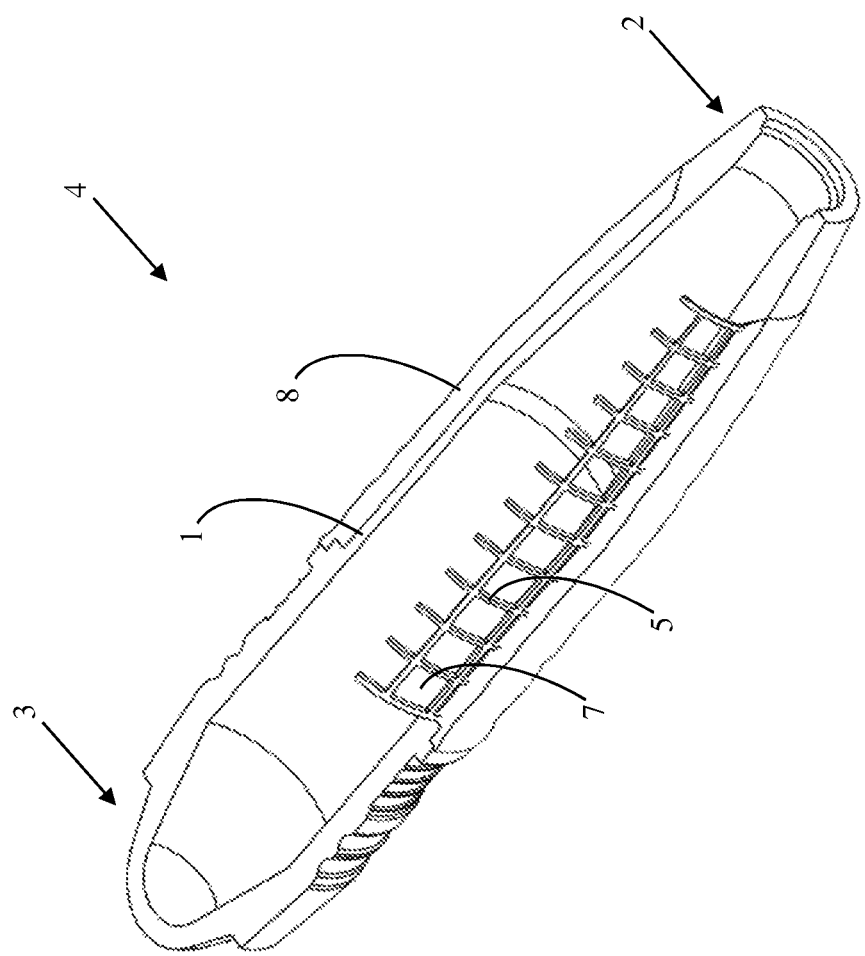
FIG. 4 a partially cut view of a warhead according to FIG. 3.

A partial cut through warhead 4 is shown in FIG. 4, where both the net 5 and the added material 8 are visible.

Figure 5:
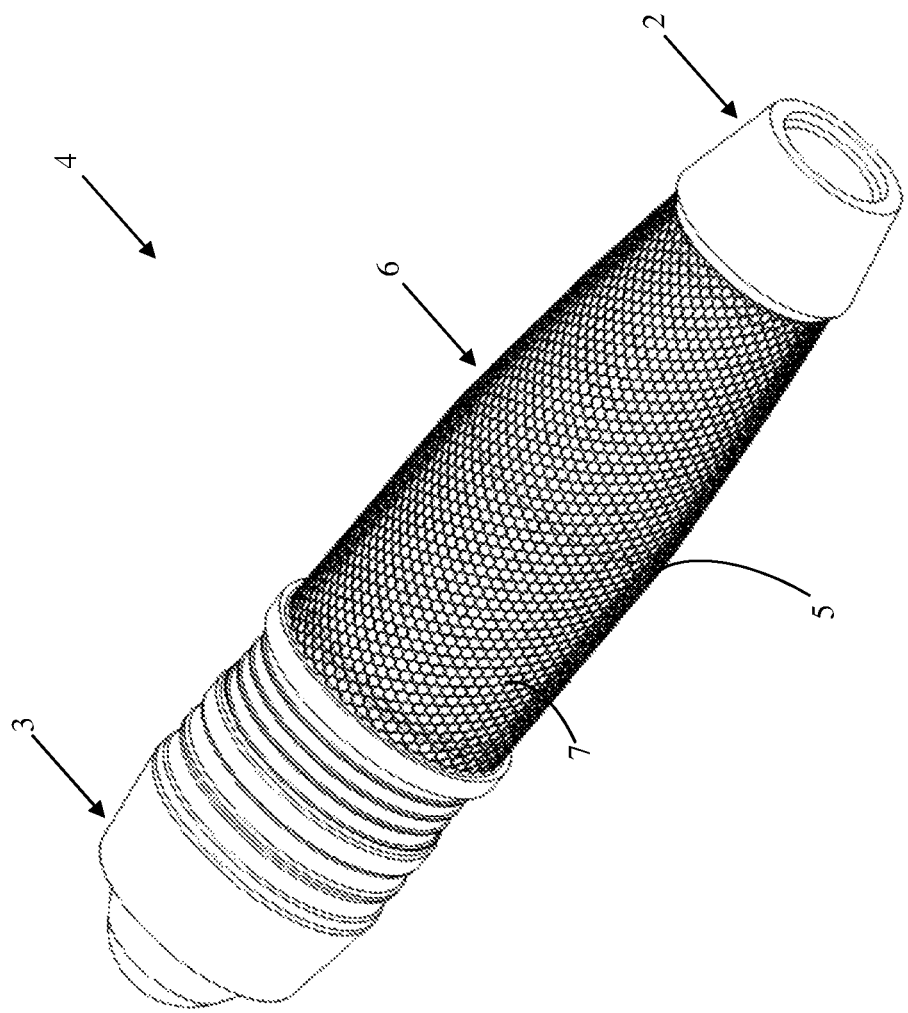
FIG. 5 a view corresponding to the one in FIG. 2 of a second embodiment of the invention.
Figure 6:
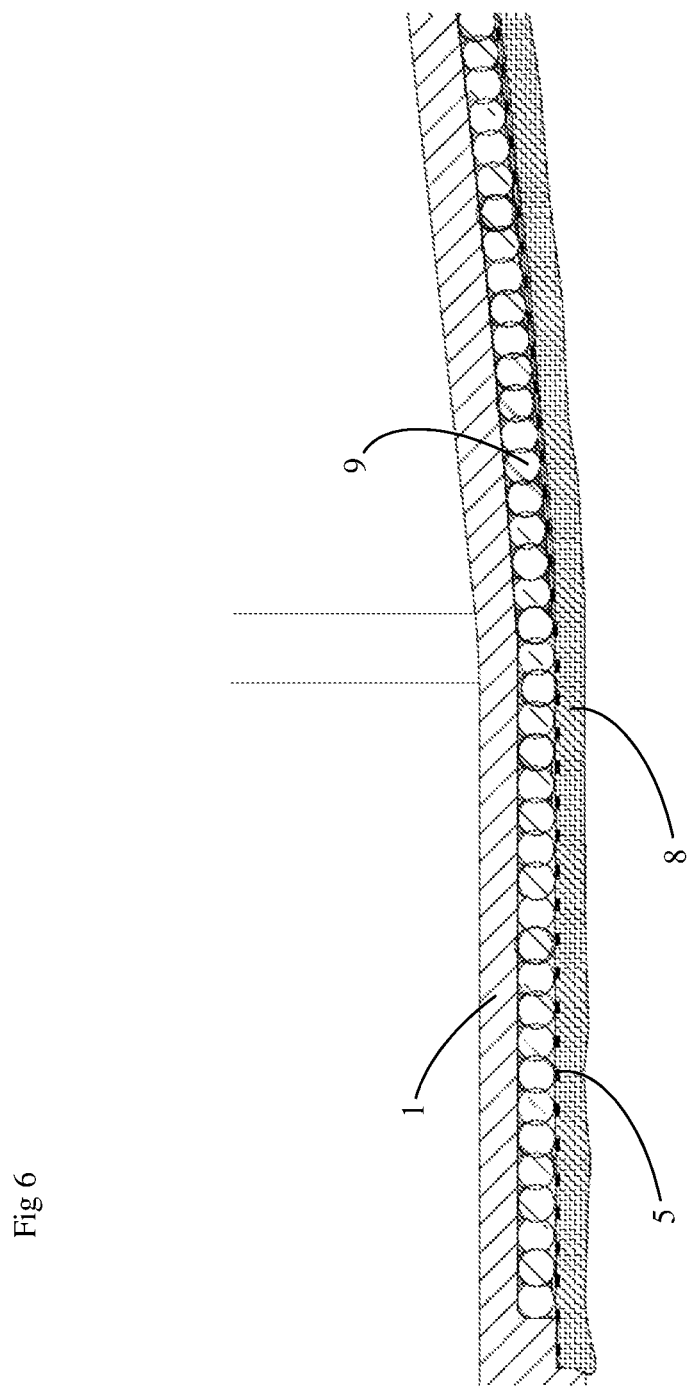
FIG. 6 a cut view of a section of the second embodiment of the warhead.

FIG. 5 shows a second embodiment of the invention. In this embodiment net 5 has considerably smaller mesh 7 than that shown in FIG. 2 and FIG. 4. A conceivable method of production of the net in FIG. 5 is that holes of the desired size are made in sheet metal, for example by die cutting, etching, laser cutting, or with some other method of production that persons skilled in the art view as suitable. The net shown is especially suitable for retention of preformed projectiles with a cross section that is somewhat larger than the size of mesh 7. A cut view of inner shell 1, net 5, added material 8, and a large number of preformed projectiles 9 of warhead 4 is shown in FIG. 6.

Arrangement of a number of preformed projectiles 9 in the warhead is accomplished with the help of a net 5 that is either a standard product or which can be manufactured in a relatively simple and cost-effect manufacturing process. Net 5 does not need to be removed but remains an integrated part of warhead 4, which considerably simplifies the manufacturing process. Net 5 also contributes to controlled fragmentation of warhead 4 in a way that provides cost-effective production of warhead 4.

Figure 7:
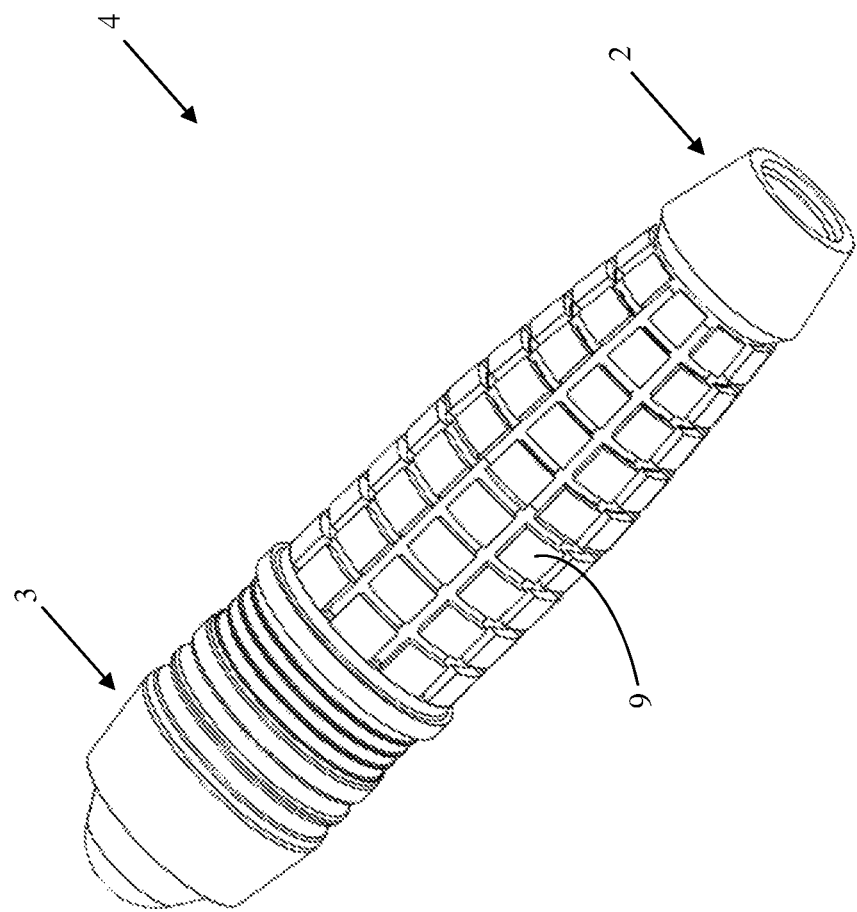
FIG. 7 a perspective view of a partially assembled warhead according to the third embodiment of the invention.

An additional embodiment of a warhead 4 according to the invention is shown in FIG. 7. The difference in relation to the embodiment that is shown in FIG. 6 is that the preformed projectiles 9 that are arrayed outside inner shell 1 are in part larger and in part essentially square. Depending on the desired characteristics at detonation of warhead 4, this embodiment is interesting in certain applications, but it can naturally be varied further by a person skilled in the art.

Figure 8:
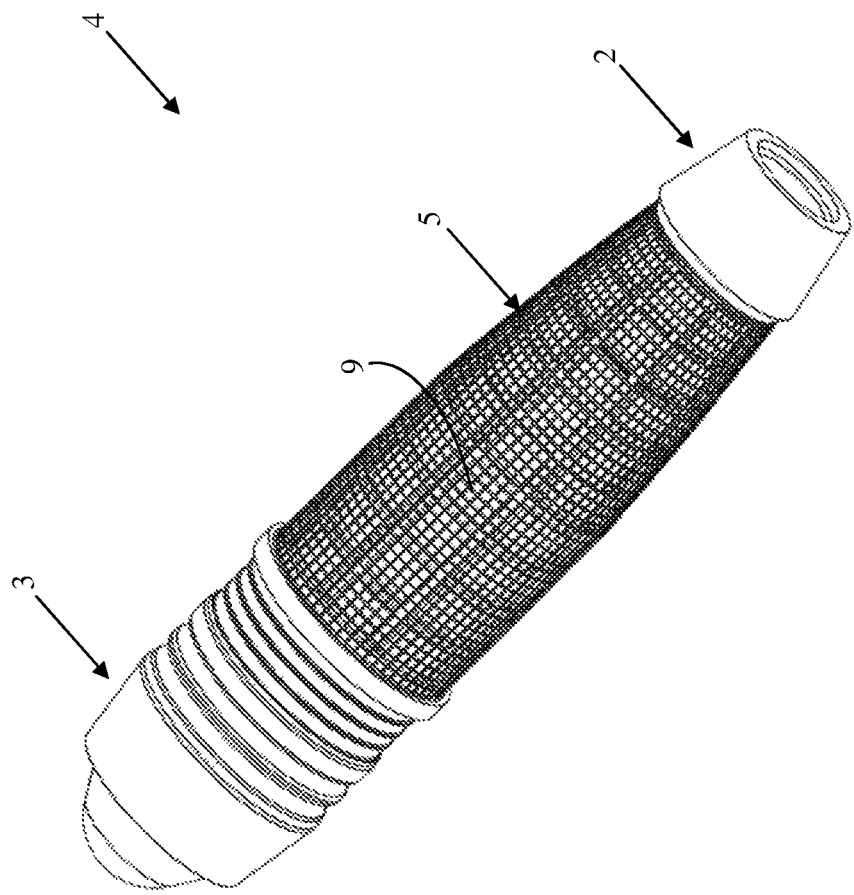
FIG. 8 a view corresponding to the one in FIG. 2 of a third embodiment of the invention.

FIG. 8 shows warhead 4 according to FIG. 7 with a net 5 provided on the outside of the preformed projectiles 9. It is clear that the mesh 7 of net 5 is smaller than the preformed projectiles 9 and will retain them before an external material 8 is laid on it.

The invention is thus variable in the framework of the attached patent claims. It can in particular be maintained that the invention comprises embodiments both with and without preformed projectiles 9. Net 5 constitutes controlled fragmentation such that it in many cases can be considered sufficient to constitute the desired effect of warhead 4. Embodiments with a combination of preformed projectiles 9 and controlled fragmentation are preferred in other cases.

The invention claimed is:

1. A procedure for producing a warhead with controlled fragmentation, the procedure comprising:
    manufacturing an inner shell and filling the inner shell with an explosive substance;
    providing a net around an outer surface of the inner shell;
    applying a material in powder form or in thread form with an additive method of manufacture on and around the net;
    manufacturing a plurality of preformed projectiles;
    arraying the preformed projectiles along the outer surface of the inner shell, inside the net, so that the preformed projectiles are retained in respective positions of the preformed projectiles; and
    applying the material in powder form or in thread form on and around the preformed projectiles simultaneously with affixing the material in powder form on and around the net.

2. A warhead produced by a procedure according to claim 1, the warhead including the inner shell, and the material in powder form applied to the warhead comprises weak points for a guided fragmentation of the material in powder form applied to the warhead upon detonation of the warhead.

3. A warhead according to claim 2, wherein the weak points in the material in powder form applied to the warhead are arranged in positions corresponding to a position of the net.

4. A warhead according to claim 2, wherein the weak points in the material in powder form applied to the warhead are arranged in other positions that are selected by deposition of the material.

5. A warhead according to claim 2, comprising a plurality of preformed fragments provided inside the material in powder form applied to the warhead.

6. A procedure for producing a warhead with controlled fragmentation, the procedure comprising:
    manufacturing an inner shell and filling the inner shell with an explosive substance;
    providing a net around an outer surface of the inner shell;
    applying a material in powder form or in thread form with an additive method of manufacture on and around the net; and
    applying the material in powder form with varying speed so that weak points are produced in the material in powder form.

7. A procedure for producing a warhead with controlled fragmentation, the procedure comprising:
    manufacturing an inner shell and filling the inner shell with an explosive substance;
    providing a net around an outer surface of the inner shell;
    applying a material in powder form or in thread form with an additive method of manufacture on and around the net; and
    applying the material in powder form with varying temperature so that weak points are produced in the material in powder form.

8. A procedure for producing a warhead with controlled fragmentation, the procedure comprising:
  manufacturing an inner shell and filling the inner shell with an explosive substance;
  providing a net around an outer surface of the inner shell;
applying a material in thread form with an additive method of manufacture on and around the net.

* * * * *